(12) United States Patent
Kountz et al.

(10) Patent No.: US 7,059,364 B2
(45) Date of Patent: Jun. 13, 2006

(54) CONTROL METHOD FOR HIGH-PRESSURE HYDROGEN VEHICLE FUELING STATION DISPENSERS

(75) Inventors: Kenneth John Kountz, Palatine, IL (US); Kenneth Robert Kriha, New Lenox, IL (US); William E. Liss, Libertyville, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 10/911,938

(22) Filed: Aug. 5, 2004

(65) Prior Publication Data

US 2005/0178463 A1 Aug. 18, 2005

Related U.S. Application Data

(60) Provisional application No. 60/543,895, filed on Feb. 12, 2004.

(51) Int. Cl.
*B65B 31/00* (2006.01)

(52) U.S. Cl. .............................. 141/4; 141/82; 141/83; 141/197

(58) Field of Classification Search .................... 141/2, 141/4, 18, 39, 40, 49, 51, 82, 83, 197; 222/146.6
See application file for complete search history.

(56) References Cited

U.S. PATENT DOCUMENTS

| | | | |
|---|---|---|---|
| 5,365,981 A * | 11/1994 | Peschka et al. ................. 141/7 |
| 5,641,005 A | 6/1997 | Kountz et al. | |
| 5,752,552 A * | 5/1998 | Kountz et al. ................. 141/83 |
| 5,771,947 A | 6/1998 | Kountz et al. | |
| 5,771,948 A | 6/1998 | Kountz et al. | |
| 5,810,058 A | 9/1998 | Kountz et al. | |
| 6,786,245 B1 * | 9/2004 | Eichelberger et al. ......... 141/4 |

* cited by examiner

Primary Examiner—Timothy L. Maust
(74) Attorney, Agent, or Firm—Mark E. Fejer

(57) ABSTRACT

A method for quick filling a vehicle hydrogen storage vessel with hydrogen, the key component of which is an algorithm used to control the fill process, which interacts with the hydrogen dispensing apparatus to determine the vehicle hydrogen storage vessel capacity.

3 Claims, 9 Drawing Sheets

CONTROL METHOD FOR HIGH-PRESSURE HYDROGEN VEHICLE FUELING STATION DISPENSERS

CROSS-REFERENCE TO RELATED APPLICATION

This application claims the benefit of provisional U.S. patent application Ser. No. 60/543,895, filed 12 Feb. 2004.

The U.S. Government has a paid-up license in this invention and the right in limited circumstances to require the patent owner to license others on reasonable terms as provided for by the terms of contract No. DE-FC36-02AL67607 awarded by the U.S. Department of Energy.

BACKGROUND OF THE INVENTION

1. Field of the Invention

This invention relates to a method and system for fueling hydrogen-fueled vehicles including internal combustion engine and fuel cell powered vehicles. More particularly, this invention relates to a method and system for controlling high-pressure hydrogen dispensers in fast-fill fueling stations to ensure complete, safe filling of vehicle on-board hydrogen storage vessels, regardless of station hydrogen supply gas and ambient conditions.

2. Description of Related Art

The on-board storage capacity of hydrogen powered vehicles, both internal combustion engine and fuel-cell powered, defines the driving range allowable before refueling is required. Underfilling of hydrogen vehicle storage vessels, during fast fill (considered to be less than about 5 minutes) charging operations, can occur at fueling stations having dispensers which incorrectly or inaccurately compensate for initial vehicle hydrogen storage vessel pressures, station supply gas conditions, and ambient temperatures. At higher ambient temperatures, i.e. greater than about 95° F., this underfilling can reach 20% or more of the rated gas mass storage capacity of the storage vessel. This underfilling represents a serious marketing obstacle to be overcome by the hydrogen supply industry, without resorting to unnecessarily high fueling station gas and vehicle storage pressures, which can increase station manufacturing costs and vehicle weights.

Undercharged vehicle hydrogen storage vessels during fast fills are partially the result of the fueling station dispenser either ignoring, or inaccurately estimating, the elevated hydrogen storage vessel gas temperatures that occur in the charging period due to compression, mixing, heat transfer to vessel walls, and other complex and transient thermodynamic processes.

During charging, the expansion of the hydrogen gas that occurs when flowing from the station ground storage reservoirs, or directly from the station compressor, does not reduce hydrogen gas temperature, as occurs, for example, in natural gas dispenser control systems, because hydrogen has a reverse Joule-Thomson effect. That is, in throttling gas flow processes, hydrogen gas temperature actually increases at the lower downstream pressures. This causes a further increase, relative to natural gas, in the transient gas temperature within the vehicle hydrogen storage vessel while it is rapidly filled. This, in turn, decreases the density of the hydrogen gas, causing severe underfilling, if not compensated for in the fill algorithm, for the same transient storage gas pressure.

The end of the charge process is often terminated when the fueling station dispenser computer measures, or estimates, that point at which the vehicle hydrogen storage vessel reaches a certain level of pressure. Depending on the dispenser, this level of vessel cut-off pressure may have some dependency on ambient or station gas conditions, but no known existing hydrogen dispensers compensate for the vessel gas temperature rise during charging as well as for initial vessel and station gas supply conditions.

The temperature that the vehicle hydrogen vessel gas reaches at the end of the dynamic charging process is difficult to accurately estimate or measure and utilize in a dispenser fill and control methodology. As previously mentioned, hydrogen storage vessel temperature is a complex function of several fueling station and initial vessel gas conditions, as well as vessel ambient and dynamic gas-to-vessel wall heat transfer conditions. Testing has shown this temperature to be non-uniform at the end of the fill.

SUMMARY OF THE INVENTION

Accordingly, it is one object of this invention to provide a method and system for fast filling of vehicle hydrogen storage vessels which reduces the potential for underfilling of the vessel.

It is another object of this invention to provide a method and system for fast filling of vehicle hydrogen storage vessels which compensates for the vessel gas temperature rise during charging.

It is yet another object of this invention to provide a method and system for fast filling of vehicle hydrogen storage vessels which compensates for initial vessel and filling station gas supply conditions.

These and other objects of this invention are addressed by a method and apparatus for filling a vehicle hydrogen storage vessel or cylinder(s) with hydrogen in which the initial gas pressure in the vehicle hydrogen storage vessel is first measured. A first portion of hydrogen is introduced into the vehicle hydrogen storage vessel for a period of time, after which the flow of the hydrogen into the vehicle hydrogen storage vessel is interrupted. During the interruption in flow, a first estimate of the volume of the vehicle hydrogen storage vessel is made, based upon which the amount of hydrogen required to achieve a predetermined rated fill condition in the vehicle hydrogen storage vessel is calculated. Thereafter, a second portion of hydrogen is introduced into the vehicle hydrogen storage vessel until the actual amount of hydrogen introduced into the vehicle hydrogen storage vessel substantially corresponds to the calculated amount of hydrogen required to achieve the predetermined rated fill condition. At this point, the flow of hydrogen is again interrupted, during which interruption the amount of hydrogen to be introduced into the vehicle hydrogen storage vessel to achieve a full rated fill condition is calculated. A third portion of hydrogen corresponding to the calculated amount of hydrogen required to achieve the full rated fill condition is then introduced into the vehicle hydrogen storage vessel, resulting in the vehicle hydrogen storage vessel being substantially filled with hydrogen.

The crux of this invention is an algorithm used to control the fill process, which interacts with the hydrogen dispensing apparatus to determine the vehicle hydrogen storage vessel capacity. In addition, there is no requirement of on-board vehicle instrumentation, or interaction either by means of vehicle installed bar coding or other electronic or radio means with the hydrogen dispenser, thereby contributing to lower dispenser and vehicle costs.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

We have developed a unique and dynamic model of a hydrogen fast fill process, called CHARGEH2, and have correlated the results of that model output to experimental data on actual vehicle hydrogen storage vessel fill cases, over a wide variety of supply, ambient, and vessel gas conditions. Regression equations were fitted with the results obtained from the model to permit relatively easy implementation in the software available on current microprocessors, and a hydrogen dispenser control algorithm was developed, enabling use of minimal dispenser instrumentation.

Figure 1:
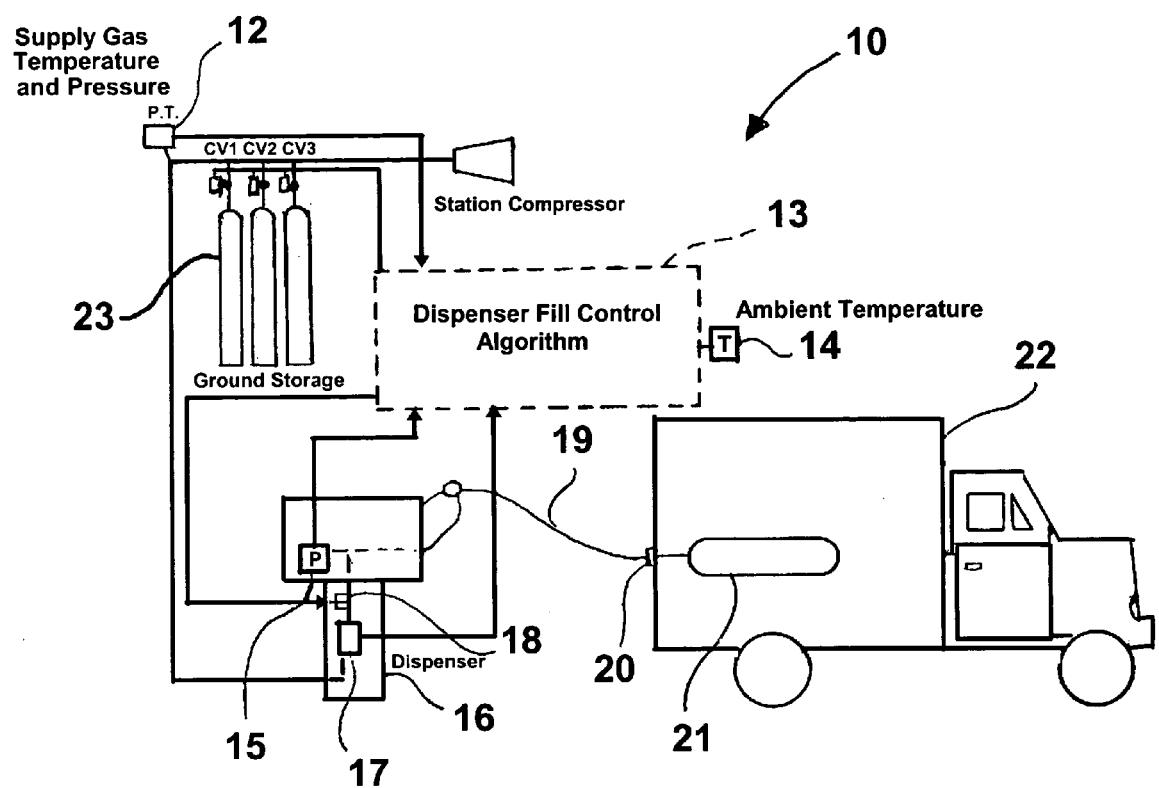
FIG. 1 is a general schematic diagram showing the hydrogen dispenser control instrumentation and location employed in the method and system of this invention.

FIG. 1 shows a hydrogen gas dispenser control system 10 in accordance with one embodiment of this invention suitable for carrying out the method of this invention. The system comprises a ground storage facility comprising a multi-stage or cascade supply unit in the form of cylinders 23, each of which is equipped with a control valve labeled CV1, CV2, and CV3 for controlling the particular cascade cylinder supplying gas for the vehicle hydrogen storage vessel fill in use at any time. The control over these valves is part of the software implemented in the dispenser control method of this invention, which is described in greater detail herein below. Pressure and temperature transducers 12 are located as shown in the supply line, which transducers measure the instantaneous gas conditions entering the dispenser mass flow meter 17 disposed within dispenser 16. Their measurements are transmitted to the computer software implemented in the dispenser fill control algorithm 13 through suitable computer I/O devices. The gas flow rate and accumulated flow through the dispenser mass flow meter 17 are also transmitted to the dispenser control through a dedicated I/O device. The supply gas then flows through a solenoid fill valve 18, located in the dispenser 16, which serves to control the gas flow to the vehicle 22, through a dispenser hose 19. When closed, solenoid fill valve 18 also isolates the high-pressure supply gas from the vehicle hydrogen storage vessel pressure, enabling the vehicle hydrogen storage vessel pressure to be measured by the indicated vessel pressure transducer 15 located within the dispenser 16.

The fill gas passes into the vehicle hydrogen storage vessel 21 through a fill nozzle and then through a vehicle fill receptacle 20 located on the vehicle 22. The receptacle 20 typically comprises a check valve arrangement that prevents back flow from the vehicle hydrogen storage vessel to the ambient. The indicated temperature transducer 14 measures ambient temperature.

Vehicle Cylinder Fill Steps

Figure 2:
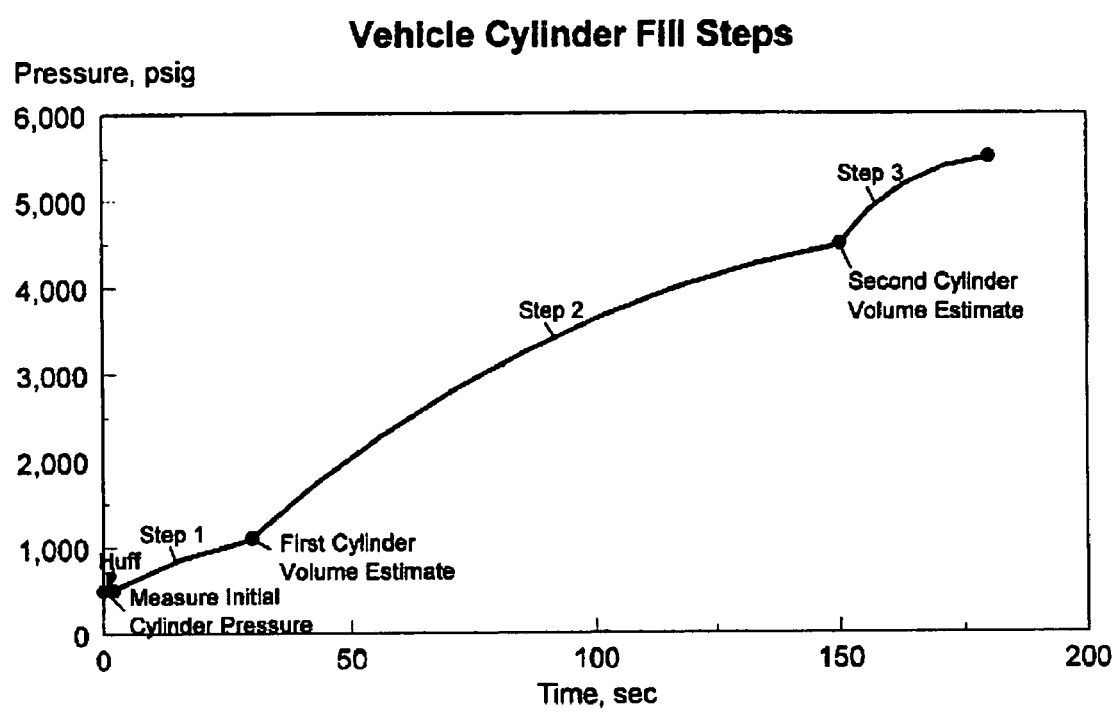
FIG. 2 is a diagram showing vehicle hydrogen storage vessel fill steps in accordance with the method of this invention.

The steps in the vehicle hydrogen storage vessel fill method in accordance with one embodiment of this invention are schematically shown in FIG. 2. The fill times and vessel or cylinder pressures shown in the FIG. 2 are merely exemplary of the method of this invention and do not necessarily correspond to actual times and pressures employed.

Starting at the beginning of the fill method is an initial step in which the fill solenoid 18 is briefly opened and then closed. This initial step is implemented by the dispenser fill control algorithm. This extremely small flow allows for the opening of the check valve in the vehicle fill receptacle 20, which again closes when the pressure is equalized between the dispenser hose 19 and the vehicle hydrogen storage vessel 21, thereby enabling measurement of the initial vehicle hydrogen storage vessel pressure by means of pressure transducer 15 disposed within dispenser 16.

Based on this initial determination of vehicle hydrogen storage vessel pressure, fill step 1, shown in FIG. 2, is implemented by the dispenser fill control algorithm, in a manner to be discussed in greater detail herein below, during which the vehicle hydrogen storage vessel pressure increases as shown until the end of the fill step is reached, typically at about a 10% rated fill condition. The vehicle hydrogen storage vessel pressure at the end of fill step 1 and the measured hydrogen gas flow for the duration of fill step 1 permits, through the software implemented in the control methodology, the computation of a first estimate of the vehicle hydrogen storage vessel volume. Based upon this computation, the dispenser fill control algorithm estimates the amount of hydrogen gas required to be injected for a predetermined rated fill condition, typically about a 90% rated fill condition, and implements fill step 2.

As fill step 2 progresses, the amount of hydrogen gas actually dispensed through the dispenser mass flow meter 17 is compared to the computed amounts obtained at the end of fill step 1, and the hydrogen gas flow is stopped when this mass of injected hydrogen gas is realized.

At the end of fill step 2, the vehicle hydrogen storage vessel pressure, together with the mass of hydrogen gas injected into the storage vessel from the beginning of the fill process to the end of fill step 2, permits a second, more accurate, computation to be made of the vehicle hydrogen storage vessel volume. Based on this second calculated value of storage vessel volume, the control software computes the amount of hydrogen gas needed for a full rated fill and opens the dispenser solenoid fill valve 18, thereby initiating fill step 3.

During fill step 3, the amount of hydrogen gas injected into the storage vessel is compared to the computed value for a full rated fill, as determined at the end of fill step 2, and when the measured hydrogen mass reaches the full rated fill computed value, the fill process is stopped. The dispenser display is notified that the fill has ended, and the vehicle customer may remove the fill nozzle from the vehicle receptacle.

Figure 3:
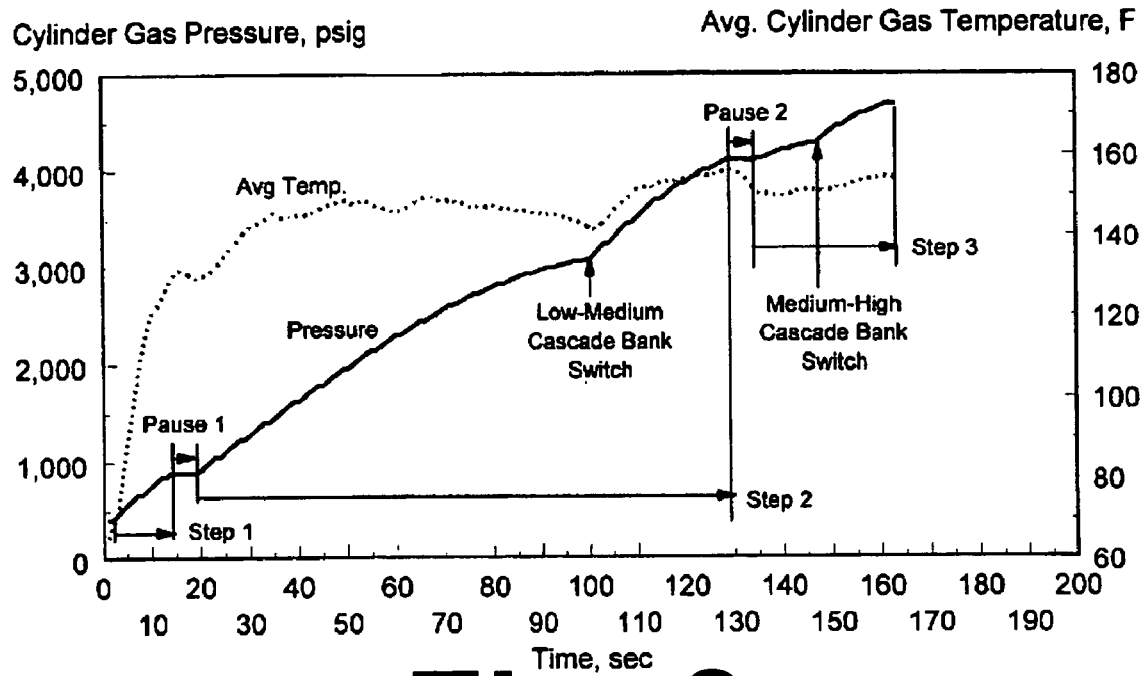
FIG. 3 is a diagram showing typical pressures and temperatures encountered during filling of a vehicle hydrogen storage vessel in accordance with one embodiment of the method of this invention.

A typical vehicle hydrogen storage vessel fill sequence showing the hydrogen gas pressure and temperature rise during a fast fill in accordance with the method of this invention is shown in FIG. 3. In this fill sequence, the initial vehicle hydrogen storage vessel pressure was about 400 psig and the initial vehicle hydrogen storage vessel gas temperature was about 65° F. The final gas temperature at the end of the fill was about 155° F., which if not accounted for in the dispenser fill process, would result in significant underfilling of the storage vessel and subsequent lower driving range for the vehicle owner.

Dispenser Control Flow Diagram

The dispenser control flow diagram for controlling the method of this invention is shown in FIGS. 4A through 4F. The function of each control block shown is discussed below.

Beginning at Block 1 (FIG. 4A), the control indicates the dispenser is operable at a rated vehicle pressure of 5000 psig (CYLPRAT) with overpressure allowed to 6250 psig (CYLPMAX). If the control software is employed in a dual (or greater) use dispenser, where vehicles with different rated pressures are refueling, then the dispenser nozzle used in the refueling, in accordance with one embodiment of this invention, could be used to indicate to the dispenser the vehicle storage vessel rated pressure, and the overpressure allowed would be similarly computed.

In Block 2, the ambient temperature transducer is read and the value stored as variable TRI.

The initial step for the fill process is started in Block 3, where cascade valve 1 (CV1) is opened, and then the solenoid fill valve is briefly opened and then closed for about 3 seconds to allow for pressure equalization between the dispenser fill hose and the vehicle hydrogen storage vessel volume. The small flow during this step is measured as DELMRO, and the initial vehicle hydrogen storage vessel pressure is measured and stored as the variable PRI.

Based on the above measurements, the initial density of the gas in the vehicle hydrogen storage vessel volume, DENI, and the rated density, DENRAT are computed by means of Subroutine H2DENC. The initial fill ratio, FRI, the ratio of the initial vehicle hydrogen density to the rated density, is computed and the algorithm determines (Block 5) if the computed value is greater than 0.8, thereby indicating whether the customer is "topping off" the vehicle hydrogen storage vessel. If FRI is greater than 0.8, the software progresses via path G, to the logic shown in FIG. 4B.

Cascade Valve Control

The cascade valve control logic runs in the background of the main fill algorithm. The logic is shown in FIG. 4F, blocks 41–54. The function of the cascade valve control logic is to minimize fill time by maintaining the fill flow rate above a specified value. This value can be defined in Block 46 of FIG. 4F; in this case, it has been set to 1 lbm (pound mass)/min.

As previously indicated, during the initial step of the fill method, cascade valve 1 (CV1) is opened to provide supply pressure to the dispenser. Upon completion of the initial step, the logic for the cascade valve control sequencing is activated. This logic remains active as long as the solenoid fill valve 18 is open.

The driving force behind the fill rate is the pressure difference between the supply (PS) and the receiver (PR). For the logic shown in FIG. 4F, the criteria for a cascade valve change is a pressure difference between the supply and the receiver of, for example, less than 500 psi and a flow rate, for example, of less than 1 lbm/min. When the criteria for a cascade valve change has been met, the algorithm, in blocks 48 and 49, determines which valve is currently open. The open valve is closed and the next valve in the cascade sequence, CV2, is opened. If the final valve in the cascade, e.g. CV3, has been opened and the fill has still not been completed, the fill can either be terminated due to lack of storage supply or the valve can be left open and filling can continue at a reduced rate.

Topping Off Algorithm

Assuming FRI is greater than 0.8, Block 11 (FIG. 4B) determines if FRI is greater than 0.98, i.e. the vehicle is trying to be filled from an initial state which indicates it is already 98% full. If this condition is present, the fill algorithm terminates the fill, by way of Block 42 (FIG. 4F). If FRI is between 0.8 and 0.98, the algorithm progresses to the test in Block 13, where it is determined whether FRI is between 0.8 and 0.9. If the answer is Yes, the computations progress to Block 14, where variables DELP8, DELP9, and DELPFF are computed. If the test result of Block 13 is No, Block 15 computes DELP9 and DELPFF.

Block 16 computes the hydrogen mass to be injected in fill step 1, DELMR1. Block 17 implements fill step 1, after which the storage vessel pressure PR1, and the dispensed hydrogen mass, DELMRTOTI1, are measured. The change in pressure, DELP1, which occurred during fill step 1 is computed in Block 17 and tested for being at least 0.5 of the DELPFF value (Block 18). If it is not at least 0.5 of the DELPFF volume, a new DELMR1 is computed in Block 19, and return is made to Block 17 for additional hydrogen to be injected until the test of Block 18 is satisfied.

Block 20 then computes the total mass of hydrogen to be injected for a full fill, DELMRFF, opens the dispenser fill solenoid valve 18 and injects the computed mass of hydrogen. Thus, the fill process for the "topping off" fill case is basically a two-step process, in deference to the normal three-step fill process implemented in the control, when FRI is less than 0.8. It should also be noted that the specific volume of the vehicle hydrogen storage vessel is not computed for the "topping off" case. The effect of different vehicle hydrogen storage vessel volumes is determined by the looping needed between Blocks 19 and 17, until the test of Block 18 is satisfied.

Fill Algorithm for Normal, Non-Topping Off, Case

If the test of Block 5 on FRI indicates a normal, non-topping off, case for the refueling, fill step 1, Blocks 6 and 7, is implemented. First, about a pound of hydrogen is injected into the storage vessel, by opening the dispenser fill solenoid valve 18, and monitoring the mass of hydrogen injected through the dispenser mass flow meter 17. At the end of this period of hydrogen injection, the storage vessel pressure is measured, PR1, and the change in storage vessel pressure from PR1 is compared to 500 psi in Block 8. If the change in pressure is less than 500 psi, a new change in the mass of hydrogen to be injected is computed in Block 9, and the control loops to Block 7, where the new mass quantity of hydrogen is injected into the vehicle storage vessel. The loop continues until the change in pressure test in Block 8 is satisfied, at which point the control algorithm continues in Block 10. It should be noted that during all fill steps, the running average hydrogen supply pressure and temperature, PSAVG1, and TSAVG1, are measured by the pressure and temperature transducers 12 located in the supply line to the dispenser from the ground storage cascade.

Figure 4A:
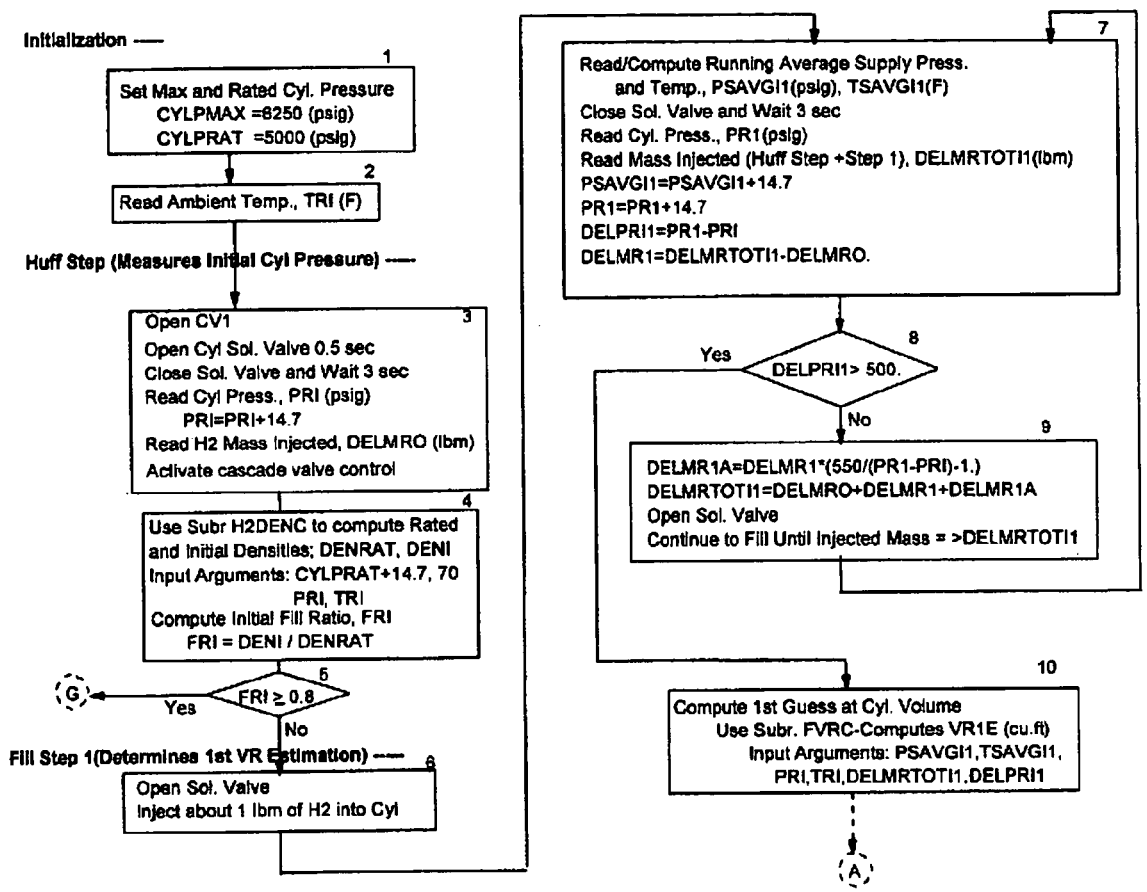
FIGS. 4A–4F show a schematic flow diagram of the dispenser control algorithm employed in the method and system of this invention.
Figure 4B:
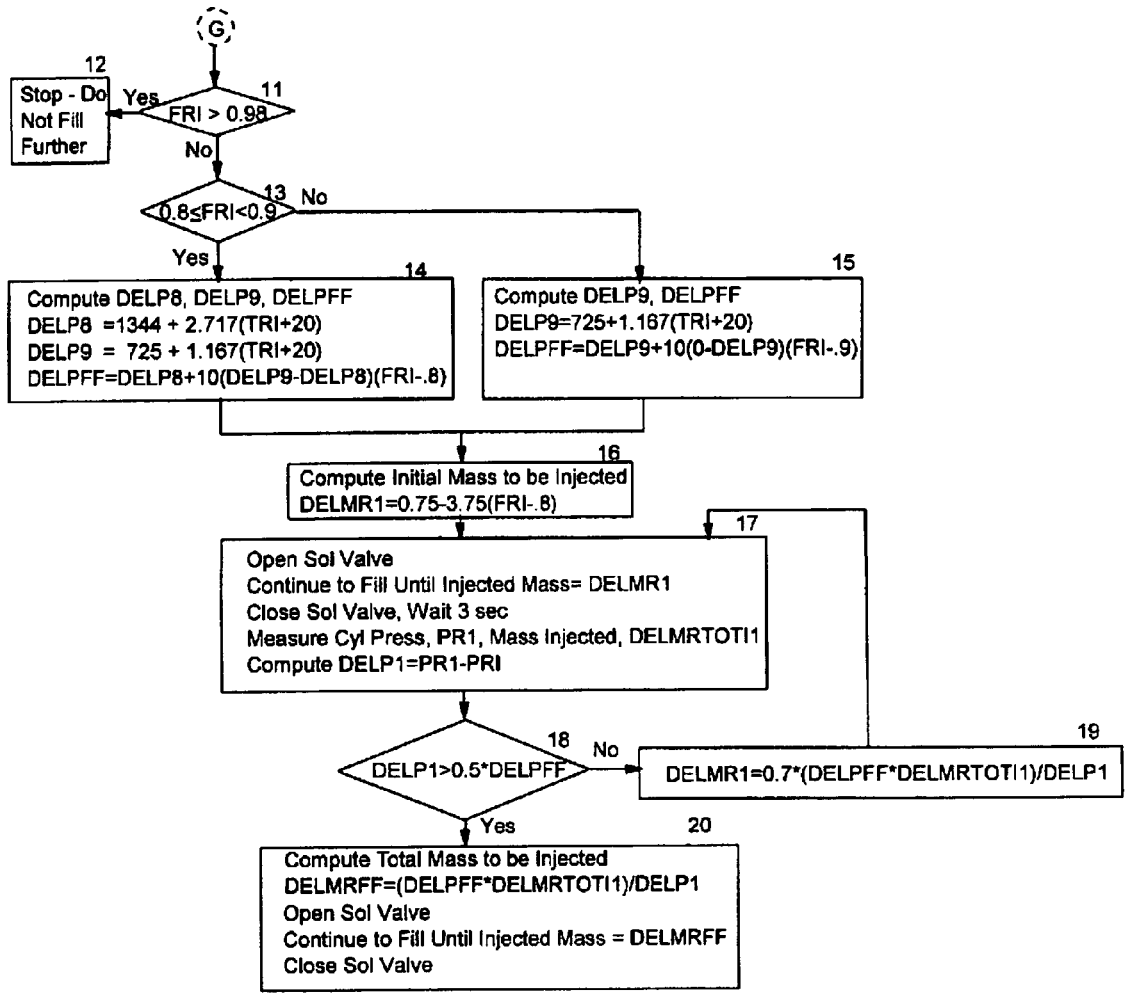
Figure 4C:
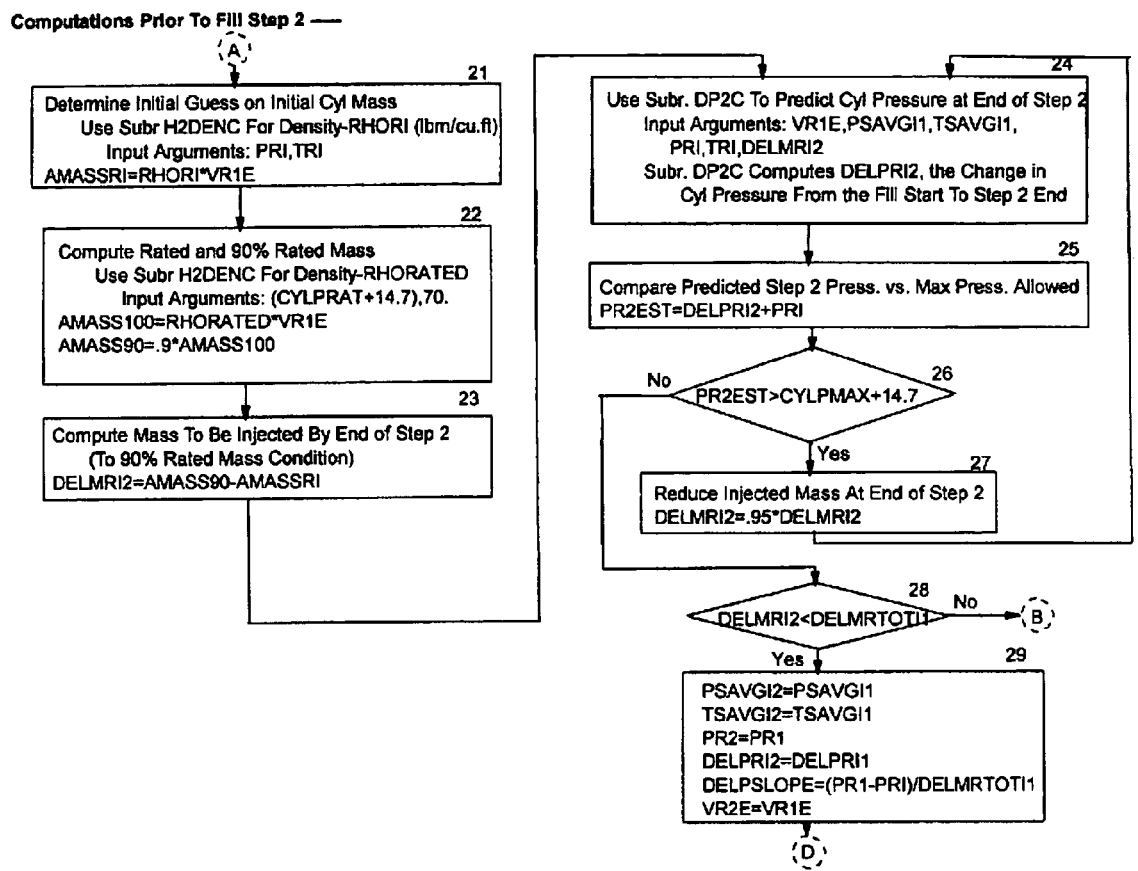
Figure 4D:
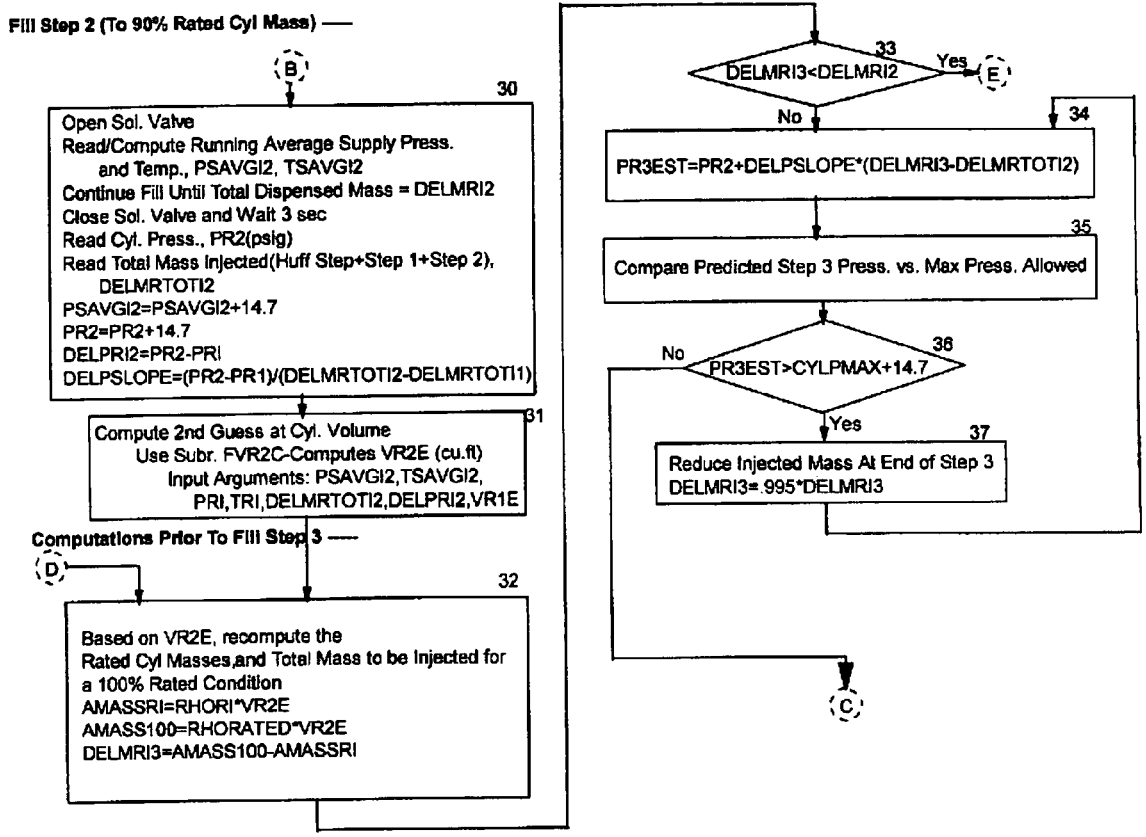
Figure 4E:
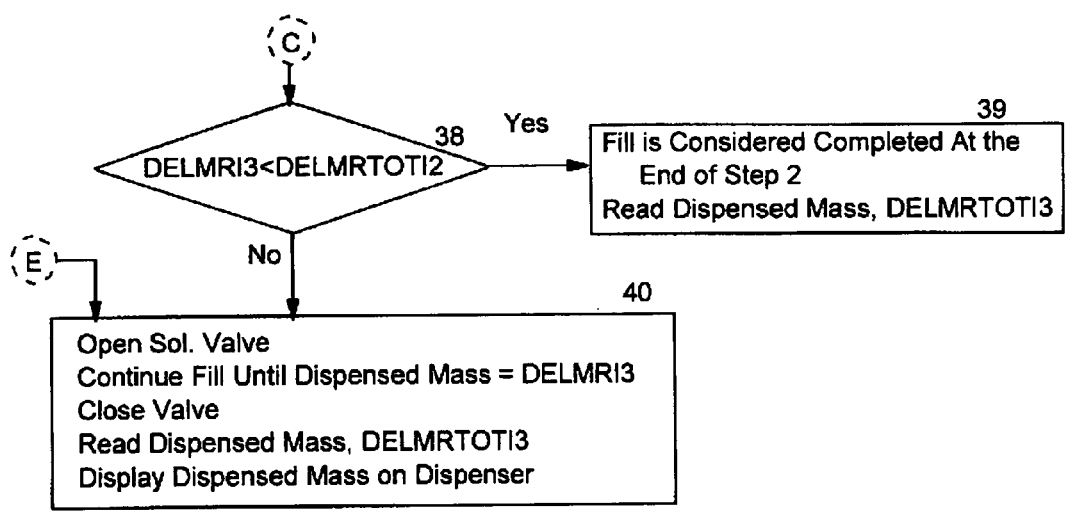
Figure 4F:
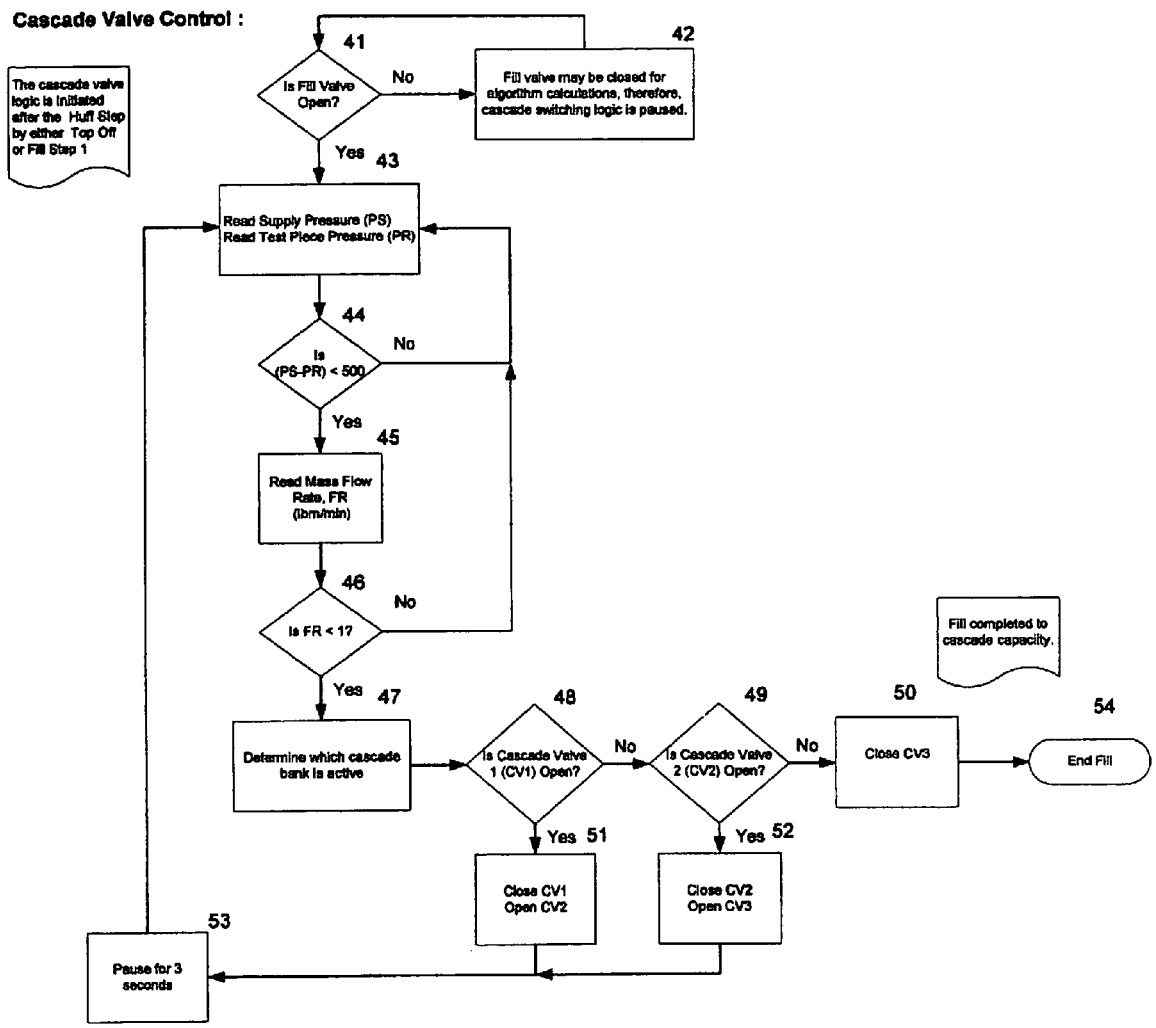

Byway of Block 10, the fill algorithm then computes a first guess at the vehicle hydrogen storage vessel volume, VR1E, by utilizing software subroutine FVRC, and the control algorithm continues on FIG. 4C, by way of path A, to Block 21.

In Block 21, using VR1E, and the initial vehicle storage vessel gas density, RHOI, the initial mass of hydrogen in the storage vessel, AMASSRI, is computed. The rated storage vessel mass, AMASS100, and the storage mass at 90% fill capacity, AMASS90, are then computed by way of Block 22. This allows the amount of hydrogen to be injected through fill step 2, DELMRI2, to be calculated.

In Block 24, based on the calculated DELMRI2, the predicted storage vessel pressure at the end of fill step 2, is computed using software subroutine DP2C. The predicted pressure, PR2EST, is compared to the allowable maximum vessel pressure, CYLMAX, in Block 26. If the predicted pressure is greater than CYLPMAX, the amount of hydrogen gas to be injected in fill step 2 is reduced, in Block 27, and the control software loops back to Block 24. If PR2EST is less than CYLMAX, the control algorithm passes to the test in Block 28.

In Block 28, the amount of injected hydrogen through fill step 2 is compared against the measured amount at the end of fill step 1, DELMRTOTI1. If DELMRI2 is less than DELMRTOTI1, the fill step 2 is omitted, and fill step 1 effectively becomes fill step 2, in Block 29. The second guess at the storage vessel volume, VR2E, is set to VR1E, and control is transferred to fill step 3 by way of path D to Block 32.

If, in the test of Block 28, DELMRI2 is greater than DELMRTOTI1, control is passed to Block 30 for implementation of fill step 2. As in fill step 1, the dispenser fill solenoid valve 18 is opened, and the mass of hydrogen injected into the vehicle hydrogen storage vessel 21 is compared to DELMRI2, and when the measured injected mass of hydrogen, DELMRTOTI2, exceeds DELMRI2, fill step 2 is terminated.

A second, improved computation of the vehicle hydrogen storage vessel volume, VR2E, is made in Block 31 by utilizing subroutine FVR2C. Utilizing VR2E in Block 32, the initial vessel mass, AMASSRI, the rated mass, AMASS100, and the change in mass, DELMRI3, i.e. the total mass to be dispensed, for a 100% fill are computed.

Block 33 compares DELMRI3 with the mass to be injected at the end of fill step 2, DELMRI2 in Block 33. If DELMRI3 is less than DELMRI2, the control transfers to Block 40, and fill step 3 is accomplished when the dispensed mass, DELMRTOTI3, equals DELMRI3.

If the test in Block 33 indicates additional mass is to be injected by fill step 3, Block 34 is used to estimate the storage vessel pressure at the end of the step, PR2EST. Block 36 compares PR2EST with the maximum vessel pressure, CYLPMAX. If the test fails, the amount of mass to be injected through fill step 3, DELMRI3, is reduced in Block 37, to 99.5% of its previous value and the control loops to Block 34. This looping continues until the test of PR3EST, in Block 36, is satisfied and control is transferred to Block 38 by way of path C.

In Block 38, the predicted injected mass of hydrogen from the beginning of the fill process to the end of fill step 3, DELMRI3, is compared to the amount of injected mass at the end of fill step 2, DELMRTOTI2. If DELMRI3 is less than DELMRTOTI2, the fill is considered to be completed at the end of fill step 2. If DELMRI3 is greater than DELMRTOTI2, control is passed to Block 40 and fill step 3 is initiated by opening the fill valve and monitoring the total dispensed mass of hydrogen until it reaches DELMRI3. Completion of the fill process is thereby achieved and the final dispensed mass of hydrogen is available to the dispenser for customer display.

Discussion of Dispenser Control Computational Subroutines

The regression equations and control system methodology referred to herein above and in the control logic diagrams shown in FIGS. 4A through 4F, are appended at the end of this description in the form of FORTRAN subroutines. In the actual dispenser software, these routines would be implemented in the language corresponding to the microprocessor selected for use in the dispenser computer.

The documentation in each subroutine provides information on the routine's function and the units of the input and output arguments. Following is a brief description of each routine.

Subroutine H2DENC

This subroutine computes the density of hydrogen based on regression equations which have been fitted to the density relationships given in the National Bureau of Standards software, NIST12 version 5.0. The routine provides accurate density results for hydrogen gas pressures between 14.7 psia and 10,000 psia, and for temperatures between −50° F. and +410° F.

Subroutine DP1C

This subroutine computes the change in hydrogen pressure expected for small injections of hydrogen mass into a vehicle hydrogen storage vessel. Small mass injections are defined as those which produce about a 250 psi pressure change from the initial hydrogen pressure. This subroutine is called by Subroutine FVRC in determining the dispenser algorithm's first guess at the vehicle hydrogen storage vessel volume.

Subroutine FVRC

This subroutine finds the first estimate of the vehicle hydrogen storage vessel volume, VR1E, based on vehicle storage volume pressure and injected hydrogen mass after the first fill step. It utilizes Subroutine DP1C in its iteration to a volume solution.

Subroutine DP2C

This subroutine computes the change in hydrogen pressure expected for large injections of hydrogen mass into a vehicle hydrogen storage vessel. Large mass injections are defined as those which produce about a 90% rated fill into the cylinder. This subroutine is called by Subroutine FVR2C in computing the dispenser algorithm's second determination of the vehicle hydrogen storage vessel volume.

Subroutine FVR2C

This subroutine computes the second estimate of the hydrogen vehicle storage volume, VR2E, based on vehicle storage pressure and injected hydrogen mass after fill step 2. It uses Subroutine DP2C in its iteration scheme to a volume solution.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

Fortran Listings of Computational Subroutines

1. Hydrogen Density Calculation

```
$NOTRUNCATE
      SUBROUTINE H2DENC(P,T,RHO)
C
C     THIS SUBROUTINE COMPUTES THE DENSITY OF HYDROGEN FOR
C     PRESSURES BETWEEN 14.7 AND 10000 PSIA, AND FOR TEMPS
C     IN THE RANGE OF -50 TO 410 F
C     THE ORIGINAL REGRESSION EQUATION APPLIED TO STRAPP FORMULATED
C     DENSITY VALUES. THIS ROUTINE CORRECTS THOSE DENSITIES PER
C     NIST12, VERSION 5.0
C
C     UNITS: P - PSIA, T - F, RHO - LBM/FT**3
C
      DIMENSION A0(4),A1(4),A2(4),A3(4),A4(4),A5(4),A6(4),A7(4)
      DATA A0/-.2828291E-03, .7942139E-03, .1244812E+00, .2915990E+00/
      DATA A1/-.7141582E-05,-.1803893E-04, .5251516E-05,-.9172396E-05/
      DATA A2/ .1031741E-05, .1044387E-04,-.1551584E-03,-.5962648E-04/
      DATA A3/ .1899670E+00, .1875842E+00, .1554030E+00, .1336746E+00/
      DATA A4/-.5838905E-02,-.4065081E-02,-.2131346E-02,-.1390861E-02/
      DATA A5/-.1399503E-08,-.1715746E-08,-.1549049E-08,-.9475618E-09/
      DATA A6/-.8626563E-09,-.1333720E-07, .2691416E-07,-.2189016E-06/
      DATA A7/ .6256912E-08, .2044501E-07, .2327688E-07, .4466839E-07/
      IF (P.LT.14.7.OR.P.GT.10000.) THEN
      WRITE (*,*) 'PRESSURE OUT OF RANGE, P=',P
      WRITE (*,*) 'PROGRAM STOPS'
      STOP
      ENDIF
      IF (T.LT.(-50).OR.T.GT.410) THEN
      WRITE (*,*) 'TEMPERATURE OUT OF RANGE, T=',T
      WRITE (*,*) 'PROGRAM STOPS'
      STOP
      ENDIF
      IF (P.LE.500) J=1
      IF (P.GT.500.AND.P.LE.2000) J=2
      IF (P.GT.2000.AND.P.LE.7500) J=3
      IF (P.GT.7500) J=4
      TR=T+459.6
      X1=P
      X2=TR
      X3=P/TR
      X4=X3*X3
      X5=P*P
      X6=TR*TR
      X7=P*TR
      RHO=A0(J)+A1(J)*X1+A2(J)*X2+A3(J)*X3+A4(J)*X4
      RHO= RHO+A5(J)*X5+A6(J)*X6+A7(J)*X7
C
C     THE FOLLOWING SECTION FORMS THE NIST12 CORRECTION FACTOR ON
DENSITY
C
      B0= .1001454E+01
      B1=-.2490943E-04
      B2= .2318733E-04
      B6= .4735108E-07
      B7=-.4362066E-10
      B8=-.2588910E-08
      B9= .1141815E-12
      B10=-.1824780E-07
      B11= .2024780E-14
      B12=-.2063783E-22
C
      Z1=T
      Z2=P
      Z6=T*T
      Z7=T*Z6
      Z8=P*P
      Z9=P*Z8
      Z10=P*T
```

-continued

```
      Z11=Z10*Z10
      Z12=Z10*Z11
C
      CF=B0+B1*Z1+B2*Z2+B6*Z6+B7*Z7+B8*Z8+B9*Z9+B10*Z10+B11*Z11+
     &B12*Z12
C
      RHO=RHO*CF
C
      RETURN
      END
```

Fortran Listings of Computational Subroutines

2. Routine for Pressure Change with Small Hydrogen Mass Injection

```
$NOTRUNCATE
       SUBROUTINE DP1C(VR,PS,TS,PRI,TRI,DELMR,DELPR)
C
C      THIS ROUTINE COMPUTES THE DELP EXPECTED FOR SMALL INJECTIONS OF MASS
C      INTO A HYDROGEN STORAGE VOLUME VR. BASED ON REGRESSION OF 12/02/02
C      WITH A .95 CORRECTION FACTOR
C
C      UNITS:
C         VR      CU.FT.
C         PS      PSIA
C         TS      F
C         PRI     PSIA
C         TRI     F
C         DELMR   LBM
C
C         DELPR   PSI
C
       A0=-.3057676E+03
       A1= .1084630E+01
       A2= .1545702E-01
       A3= .8075171E+00
       A4= .1012183E+00
       A5= .4729925E-01
       A6=-.3172333E+02
       A9= .1401287E+01
       A10= .2890973E-01
       A12=-.5897399E-05
       A14= .1326875E-01
       A15=-.1850447E-02
       A16=-.2493263E+00
       A20=-.1397173E+04
       A21= .7164415E+04
       A22= .5983077E+04
       A23=-.5880817E+04
       A26= .1487635E+06
       A27= .7103609E+05
C
       X1=VR
       X2=PS
       X3=TS
       X4=PRI
       X5=TRI
       X6=DELMR
       X9=X6*X6
       X10=X1*X1
       X12=X4*X4
       X14=X4*X6
       X15=X4*X1
       X16=X6*X1
       X20=1/X1
       X21=X20*X20
       X22=X6/X1
       X23=X22*X22
```

-continued

```
        X26=1/X2
        X27=1/(X6*X2)
C
        DELPR=A0+A1*X1+A2*X2+A3*X3+A4*X4+A5*X5+A6*X6
        DELPR=DELPR+A9*X9+A10*X10+A12*X12
        DELPR=DELPR+A14*X14+A15*X15+A16*X16+A20*X20+A21*X21
        DELPR=DELPR+A22*X22+A23*X23+A26*X26+A27*X27
C
        DELPR=DELPR*0.95
        RETURN
        END
```

Fortran Listings of Computational Subroutines       15

3. First Hydrogen Storage Volume Estimation

```
$NOTRUNCATE
      SUBROUTINE FVRC(PS,TS,PRI,TRI,DELMR,DELPR,VR1E,ICOUNT)
C
C     THIS ROUTINE FINDS THE FIRST ESTIMATE OF HYDROGEN STORAGE VOLUME
C     VR1E, BASED ON MEASUREMENTS AFTER THE IST FILL STEP
C
      ICOUNT=0
C
C     LOGIC FOR A VRGUESS
      DPR724=300.+437.5*(DELMR-.5)
      DPR1448=300.+250.*(DELMR-1.2)
      DPR2896=300.+114.75*(DELMR-2.4)
      DPR4344=300.+74.468*(DELMR-3.6)
      DPR5792=300.+56.452*(DELMR-4.6)
      DPR7240=300.+46.*(DELMR-5.5)
      DELP1=DPR724-DPR1448
      DELP2=DPR1448-DPR2896
      DELP3=DPR2896-DPR4344
      DELP4=DPR4344-DPR5792
      DELP5=DPR5792-DPR7240
      IF (DELPR.LE.DPR724.AND.DELPR.GT.DPR1448) THEN
         VRGUESS=14.48-7.24*(DELPR-DPR1448)/DELP1
      ENDIF
      IF (DELPR.LE.DPR1448.AND.DELPR.GT.DPR2896) THEN
         VRGUESS=28.96-14.48*(DELPR-DPR2896)/DELP2
      ENDIF
      IF (DELPR.LE.DPR2896.AND.DELPR.GT.DPR4344) THEN
         VRGUESS=43.44-14.48*(DELPR-DPR4344)/DELP3
      ENDIF
      IF (DELPR.LE.DPR4344.AND.DELPR.GT.DPR5792) THEN
         VRGUESS=57.92-14.48*(DELPR-DPR5792)/DELP4
      ENDIF
      IF (DELPR.LE.DPR5792.AND.DELPR.GT.DPR7240) THEN
         VRGUESS=72.40-14.48*(DELPR-DPR7240)/DELP5
      ENDIF
      IF (DELPR.LT.DPR7240) VRGUESS=72.4
      IF (DELPR.GT.DPR724)  VRGUESS=7.24
C
      VROLD=VRGUESS
      CALL DP1C(VROLD,PS,TS,PRI,TRI,DELMR,DELPROLD)
C     **********
      WRITE (15,*) 'IN SUBR FVR, AFTER 1ST CALL TO DP1'
      WRITE (15,*) 'VROLD,DELPROLD',VROLD,DELPROLD
C     **********
C     PAUSE 1
      VRNEW=VROLD+1.
  10  CALL DP1C(VRNEW,PS,TS,PRI,TRI,DELMR,DELPRNEW)
      ERROR=DELPRNEW-DELPR
C     **********
C     WRITE (15,*) 'IN SUBR FVR, AFTER CALL TO DP1 WITH VRNEW'
C     WRITE (15,*) 'VRNEW, DELPRNEW,ERROR',VRNEW,DELPRNEW,ERROR
C     **********
C     PAUSE 2
      IF (ABS(ERROR).GT.5.) THEN
         SLOPE=(DELPRNEW-DELPROLD)/(VRNEW-VROLD)
         VROLD=VRNEW
```

-continued

```
      DELPROLD=DELPRNEW
      DELVR=.5*ERROR/SLOPE
      IF (ABS(DELVR).GT..1.AND.DELVR.GE.0.) DELVR=.1
      IF (ABS(DELVR).GT..1.AND.DELVR.LT.0.) DELVR=-.1
      ICOUNT=ICOUNT+1
      IF (ICOUNT.GT.700) THEN
         VR1E=VRNEW
         RETURN
      ENDIF
      VRNEW=VRNEW-DELVR
      GO TO 10
    ELSE
      VR1E=VRNEW
      RETURN
    END IF
    RETURN
    END
```

Fortran Listings of Computational Subroutines

4. Routine for Pressure Change with Large Hydrogen Mass Injection

```
$NOTRUNCATE
      SUBROUTINE DP2C(VR,PS,TS,PRI,TRI,DELMR,DELPR)
C
C     THIS ROUTINE COMPUTES THE DELP EXPECTED FOR LARGE INJECTIONS OF
MASS
C     INTO A HYDROGEN STORAGE VOLUME VR. BASED ON REGRESSION OF
11/12/03
C
C     UNITS:
C        VR      CU.FT.
C        PS      PSIA
C        TS      F
C        PRI     PSIA
C        TRI     F
C        DELMR   LBM
C        DELPR   PSI
C
      A0=-.7444759E+05
      A1= .4653723E+02
      A2= .1021887E+02
      A3= .9719787E+01
      A4= .1064542E+01
      A5=-.5097833E+01
      A6=-.1243777E+03
      A10= .1985133E+01
      A11=-.8231029E+00
      A12= .9451122E-02
      A13=-.2999193E-03
      A14= .3197889E-07
      A15= .7511300E-02
      A16=-.9313905E-02
      A17= .1234998E+01
      A18=-.5820168E-03
      A19= .5028180E+02
      A20=-.1645809E+01
      A21=-.4628205E+04
      A22= .1160699E+05
      A23= .5184142E+04
      A24= .1255524E+03
      A25= .1722366E+09
      A26=-.3566307E+05
      A29=-.1518301E-01
      A30= .6293683E-01
      A31=-.4666259E-03
```

```
            A32=-.5251012E-01
            A33= .8873709E-07
            PS=6500.
C
            X1=VR
            X2=PS
            X3=TS
            X4=PRI
            X5=TRI
            X6=DELMR
            X10=X6*X6
            X11=X1*X1
            X12=X1*X11
            X13=X4*X4
            X14=X4*X13
            X15=X4*X6
            X16=X4*X1
            X17=X6*X1
            X18=X17*X17
            X19=X6*(X3+459.6)/(X4*X1)
            X20=X19*X19
            X21=1/X1
            X22=X21*X21
            X23=X6/X1
            X24=X23*X23
            X25=1/X2
            X26=1/(X6*X2)
            X29=X6*X6*X6
            X30=X5*X5
            X31=X2*X2
            X32=X3*X3
            X33=X29*X12
C
            DELPR=A0+A1*X1+A2*X2+A3*X3+A4*X4+A5*X5+A6*X6
            DELPR=DELPR+A10*X10+A11*X11+A12*X12+A13*X13+A14*X14
            DELPR=DELPR+A15*X15+A16*X16+A17*X17+A18*X18+A19*X19
            DELPR=DELPR+A20*X20+A21*X21+A22*X22+A23*X23+A24*X24
            DELPR=DELPR+A25*X25+A26*X26+A29*X29+A30*X30+A31*X31
            DELPR=DELPR+A32*X32+A33*X33
C
            RETURN
            END
```

Fortran Listings of Computational Subroutines          40

5. Second Hydrogen Storage Volume Estimation

```
$NOTRUNCATE
      SUBROUTINE FVR2C(PS,TS,PRI,TRI,DELMR,DELPR,VRGUESS,VR2E,
     &ICOUNT)
C
C     THIS ROUTINE FINDS THE SECOND ESTIMATE OF HYDROGEN STORAGE VOLUME
C     VR2E, BASED ON MEASUREMENTS AFTER THE 2ND FILL STEP
C
      ICOUNT=0
C
      VROLD=VRGUESS
      CALL DP2C(VROLD,PS,TS,PRI,TRI,DELMR,DELPROLD)
      WRITE (16,*) 'IN SUBR FVR2, AFTER IST CALL TO DP2'
      WRITE (16,*) 'VROLD,DELMR,DELPROLD',VROLD,DELMR,DELPROLD
C     PAUSE 1
      VRNEW=VROLD+1.
10    CALL DP2C(VRNEW,PS,TS,PRI,TRI,DELMR,DELPRNEW)
      WRITE (16,*) 'VRNEW,DELMR,DELPRNEW',VRNEW,DELMR,DELPRNEW
      ERROR=DELPRNEW-DELPR
      IF (ABS(ERROR).GT.5.) THEN
         SLOPE=(DELPRNEW-DELPROLD)/(VRNEW-VROLD)
         VROLD=VRNEW
         DELPROLD=DELPRNEW
         DELVR=.5*ERROR/SLOPE
         IF (ABS(DELVR).GT..1.AND.DELVR.GE.0.) DELVR=.1
```

```
        IF (ABS(DELVR).GT..1.AND.DELVR.LT.0.) DELVR=-.1
        ICOUNT=ICOUNT+1
        IF (ICOUNT.GT.700) THEN
          VR2E=VRNEW
          RETURN
        ENDIF
        VRNEW=VRNEW-DELVR
        GO TO 10
      ELSE
        VR2E=VRNEW
        RETURN
      END IF
      RETURN
      END
```

We claim:

1. A method for filling a vehicle hydrogen storage vessel with hydrogen comprising the steps of:

measuring an initial gas pressure in said vehicle hydrogen storage vessel;

introducing a first portion of said hydrogen into said vehicle hydrogen storage vessel;

interrupting flow of said hydrogen into said vehicle hydrogen storage vessel;

making a first estimate of a volume of said vehicle hydrogen storage vessel;

determining a first calculated amount of said hydrogen required to achieve a predetermined rated fill condition in said vehicle hydrogen storage vessel;

introducing a second portion of said hydrogen into said vehicle hydrogen storage vessel until an actual amount of said hydrogen introduced into said vehicle hydrogen storage vessel substantially corresponds to said first calculated amount;

determining a second calculated amount of said hydrogen to be introduced into said vehicle hydrogen storage vessel to achieve a full rated fill condition; and introducing a third portion of said hydrogen corresponding to said second calculated amount into said vehicle hydrogen storage vessel, resulting in said vehicle hydrogen storage vessel substantially filled with said hydrogen.

2. A method in accordance with claim 1, wherein said predetermined rated fill condition is about 90% of said vehicle hydrogen storage vessel.

3. A method in accordance with claim 1, wherein each step is controlled by a fill algorithm comprising predictive regression equations for a charged vehicle hydrogen storage vessel pressure response throughout said filling of said vehicle hydrogen storage vessel.

* * * * *